(12) United States Patent  
Pérez García

(10) Patent No.: US 7,959,183 B2  
(45) Date of Patent: Jun. 14, 2011

(54) AIRBAG COVER WITH A FRAME WITH A METALLIC APPEARANCE

(75) Inventor: Azucena Pérez García, Pontevedra (ES)

(73) Assignee: Dalphi Metal España, S.A., Madrid (ES)

( * ) Notice: Subject to any disclaimer, the term of this patent is extended or adjusted under 35 U.S.C. 154(b) by 89 days.

(21) Appl. No.: 11/988,654

(22) PCT Filed: Jul. 13, 2005

(86) PCT No.: PCT/EP2005/053348  
§ 371 (c)(1),  
(2), (4) Date: Jul. 9, 2010

(87) PCT Pub. No.: WO2007/006347  
PCT Pub. Date: Jan. 18, 2007

(65) Prior Publication Data  
US 2010/0308565 A1    Dec. 9, 2010

(51) Int. Cl.  
*B60R 21/16* (2006.01)

(52) U.S. Cl. .................................. 280/728.3; 280/731

(58) Field of Classification Search ............... 280/728.3, 280/731  
See application file for complete search history.

(56) References Cited

U.S. PATENT DOCUMENTS 6,003,895 A     12/1999   Niwa et al.  
2005/0104338 A1   5/2005   Soderquist

FOREIGN PATENT DOCUMENTS

EP       1 400 413     3/2004  
EP       1 495 921     1/2005

*Primary Examiner* — Eric Culbreth  
(74) *Attorney, Agent, or Firm* — Ladas & Parry LLP

(57) ABSTRACT

An airbag cover (1) for automotive vehicles incorporating at least one decorative element (3) as an integral part of the cover but having an appearance different to the rest of the cover and a contour delimited by two U-shaped grooves (15, 17) and having a break line (6), made up of a weakened area predetermining the line along which the break will occur during airbag bag deployment, which goes through the decorative element (3).

8 Claims, 3 Drawing Sheets

AIRBAG COVER WITH A FRAME WITH A METALLIC APPEARANCE

FIELD OF THE INVENTION

The present invention refers to an airbag cover for automotive vehicles.

BACKGROUND OF THE INVENTION

Airbag covers are currently known which have a decorative element with a metallic appearance incorporated thereon which contributes towards identifying the automobile manufacturer brand image.

The airbag cover is normally made from non-rigid plastic, the decorative element being made from a rigid plastic with a suitable coating in order to provide the metallic appearance, and the break line of the cover is arranged around the decorative element so as not to go through it.

Incorporating decorative elements of this type means, both due to their size and their weight, an increase in airbag cover inertia which may cause airbag operation deficiencies. It has been particularly detected in OOP tests that the dummy experienced an increase in head acceleration with the subsequent increase in HIC above permissible limits, and also an increase in the neck extension moment.

Proposals are also known in which the decorative element is made from a non-rigid plastic and with break lines to accompany the cover movement, contributing to reduce cover inertia, but having the drawback that they do not effectively solve the problem of cover part projections during airbag bag deployment.

Patent applications US 2004/0174002, GB 2 403 693, DE 10148279 and DE 10 2004 046 866 disclose proposals of this type.

SUMMARY OF THE INVENTION

Automobile manufacturers attribute considerable importance to the decorative elements mentioned due to their contribution to incorporating symbols associated to the brand image on the airbag cover, due to which the object of the present invention is to provide an airbag cover attending to that need and effectively solving the problems mentioned.

According to the invention, the decorative element forms an integral part of the cover, its contour being delimited by two U-shaped grooves and the decorative element going through the break line. The cover will thus be made as a single piece of a non-rigid material by means of, for example, a mould-injection process.

The decorative element has a weakened area in its intersection with the break line, but its visible side must not show any discontinuity nor undergo significant alterations during airbag assembly operations.

The decorative element can be a ring-shaped (circular or elliptic) or polygonal (triangular, square, trapezoidal) frame. It may also have the shape of a particular logo.

On the cover according to the invention, the break line goes through the decorative element and this allows optimising the shape of the flaps produced when the cover breaks during airbag bag deployment, which allows improving biomechanical criteria especially for non-typical cases of airbag activation, that is, those in which the vehicle driver or occupant is not in a normal position. On the other hand, due to the decorative element being integrated on the cover it is assured that there is no detachment of parts.

Other features and advantages of the present invention will be deduced from the following detailed description of an illustrative and in no sense limiting embodiment of its object regarding the attached drawings.

DETAILED DESCRIPTION OF THE INVENTION

Figure 1:
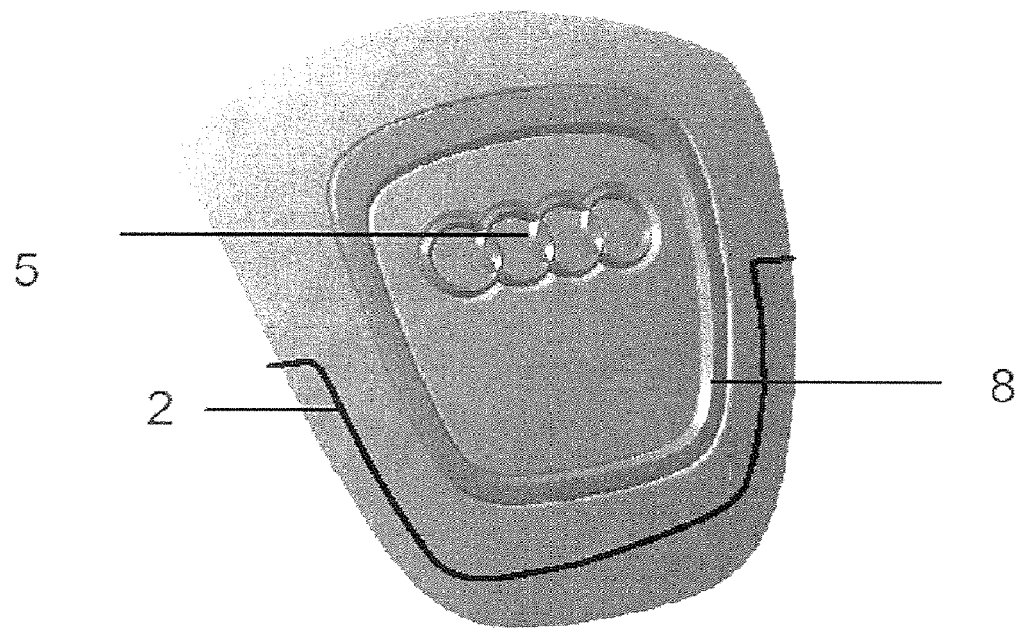
FIGS. 1 and 2 show an airbag cover known in the art on which two possible break lines have been schematically drawn.
Figure 2:
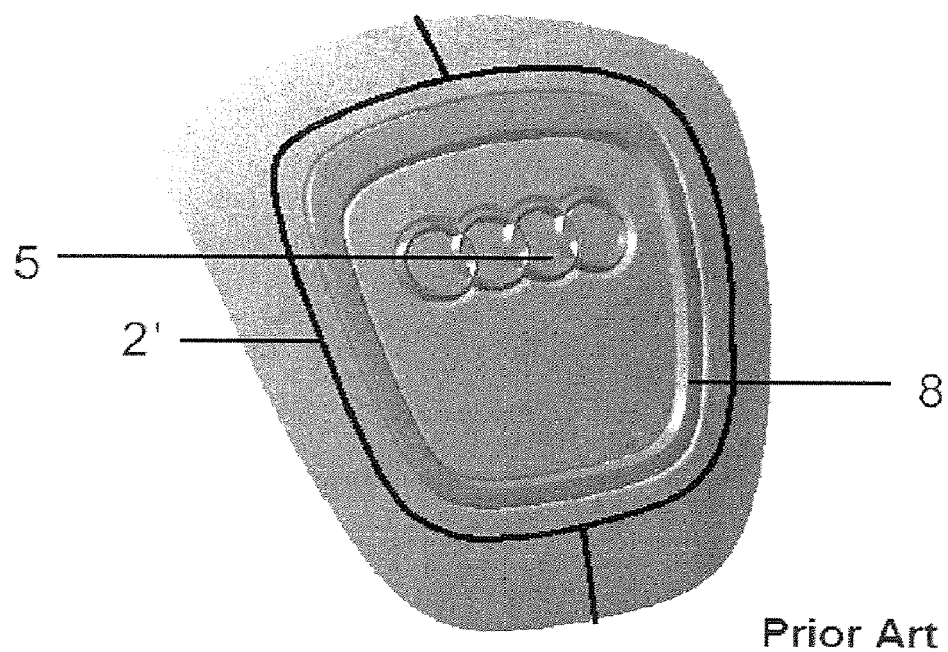

An airbag cover known in the art can be seen in FIGS. 1 and 2, incorporating a frame-shaped decorative element B and the well known AUDI logo 5. This cover is joined to the airbag module by means (not shown) well known by the person skilled in the art.

In this known cover, the decorative element 8 has a metallic appearance, provided by a suitable coating, and the break lines (2, 2') go around the frame 8 without going through it.

After this brief mention of the known art an embodiment of the invention with a decorative element 3 integrated on the cover 1 forming a single piece shall be described in reference to FIGS. 3-6.

Figure 3:
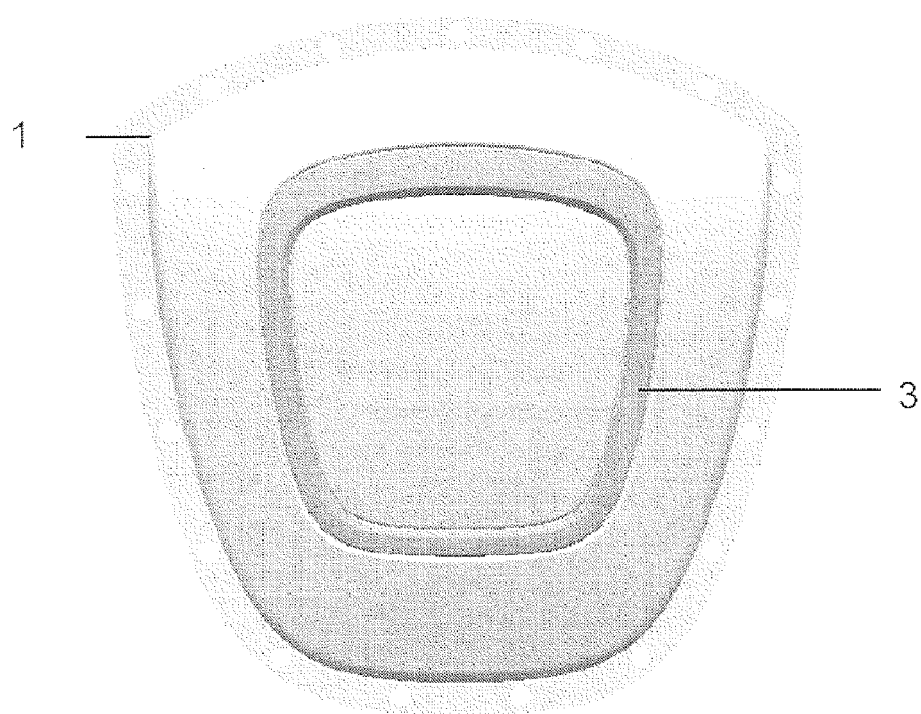
FIG. 3 shows the visible side of an airbag cover according to the invention with the decorative element integrated thereon.
Figure 4:
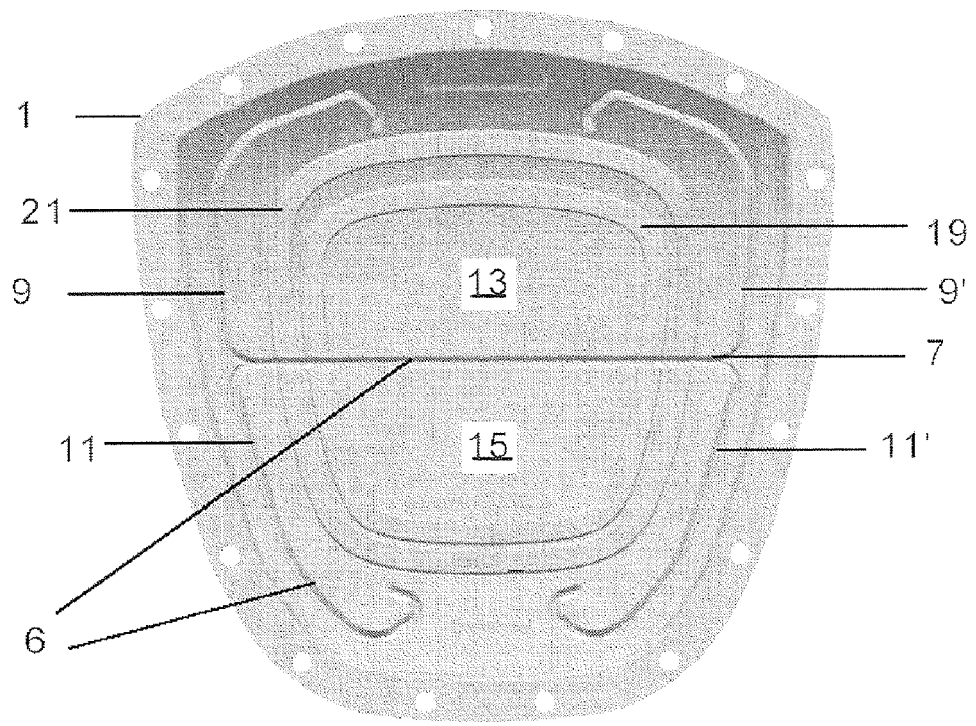
FIG. 4 shows the inner side of an airbag cover according to the invention.

FIGS. 3 and 4 show the general configuration of the cover 1 where the relevant elements regarding the present invention are, on the one hand, the decorative element 3 the metallic appearance of which is achieved by means of sputtering, high-vacuum evaporation, electrolytic deposit, and lacquer coating techniques, etc. and, on the other hand, the break line 6 on the inner side of the cover 1 with a fist linear central portion 7 extending from its ends and on each side in second portions 9,9' and 11, 11'. With this configuration, when the cover is broken as a result of airbag deployment, two flaps, 13, 15, delimited respectively by lines 9-7-9' and 11-7-11', will open.

Figure 5:
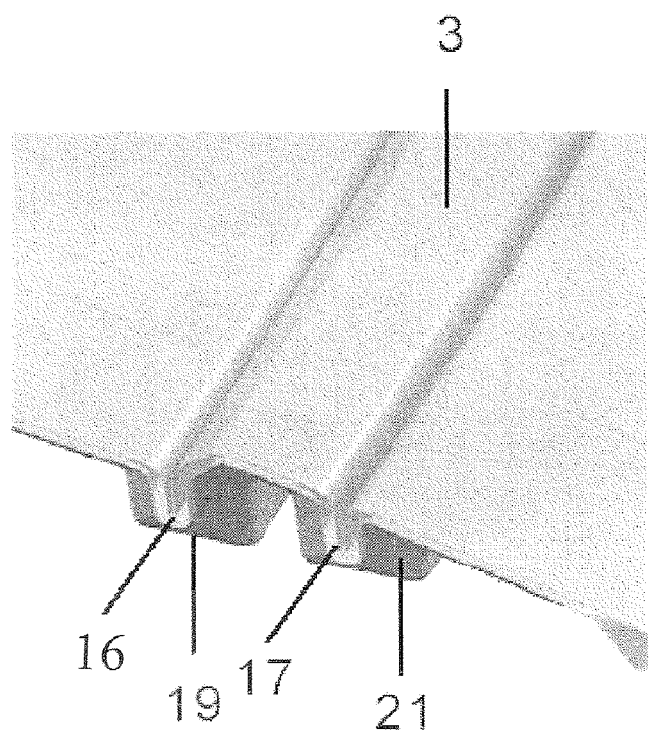
FIG. 5 shows a detail of the configuration of the decorative element integrated on the cover.

It can be observed in FIG. 5 that the decorative element 3 is delimited by two U-shaped grooves 15 and 17 and that the thickness of their bases 19, 21 in the portion delimited by the inner sides of the branches of the U is very small when representing in this Figure a section of the decorative element 3 and the areas next to the cover 1 in the plane coinciding with the break line 6 of the cover 1. That is, the bottom of the U-shaped grooves is less thick than the same bottom on the rest of the cover. In the area without the decorative element 3, the thickness of the cover in the break line 6 can be variable.

Figure 6:
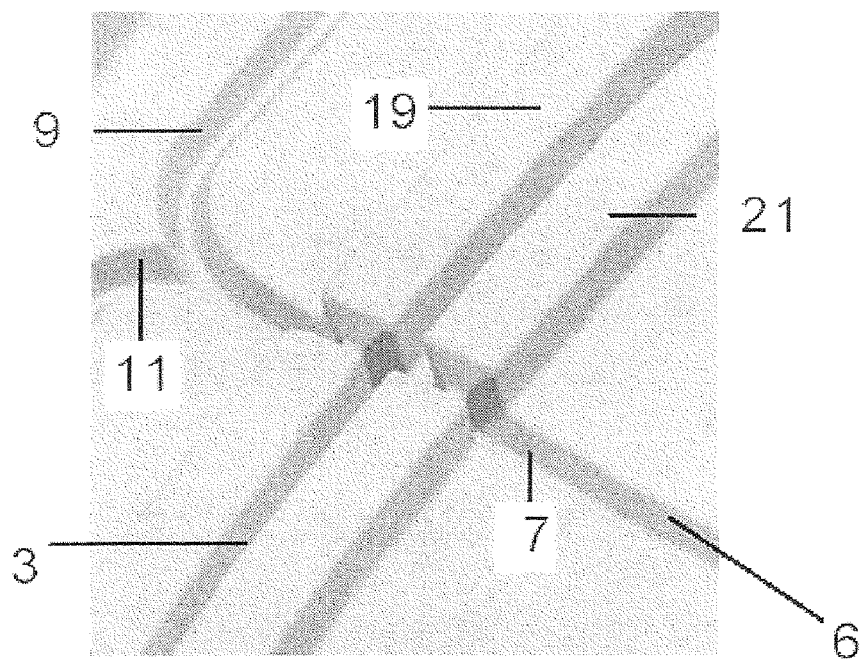
FIG. 6 shows a detail of the intersection of the break line of the cover with the decorative element integrated thereon.

FIG. 6 shows the bases 19 and 21 of the U-shaped grooves along their inner side delimiting the decorative element 3 and its intersection with the break line 6.

The mentioned configuration assures that the effects of the intersection of the decorative element 3 with the break line 6 is unnoticeable on the visible side of the cover, that is, the outer appearance of the frame is substantially the same as that of the frames made from rigid plastic.

The person skilled in the art will understand that, although the central portion of the break line perpendicularly goes through the decorative element 3 in the described embodiment, the present invention allows other break line configurations such as, for example, Y-shaped or X-shaped configurations in which three or four flaps would exist, respectively.

The person skilled in the art will likewise understand that the decorative element 3 may be of a different shape than that of a trapezoid frame with rounded edges shown in the Figures.

Although an embodiment of the invention has been described and represented, it is obvious that modifications comprised within the scope thereof may be introduced, the invention not being considered limited to said embodiment but to the content of the following claims.

The invention claimed is:

1. An airbag cover (1) for automotive vehicles with a break line (6) made up of a weakened area predetermining a line along which a break will occur during airbag bag deployment, incorporating at least one decorative element (3) having an appearance different from a rest of the cover, wherein the decorative element (3) is an integral part of the cover (1) and has a contour that is delimited by two U-shaped grooves (15, 17), and wherein the break line (6) goes through the decorative element (3).

2. An airbag cover (1) according to claim 1, wherein the break line (6) is configured so that when breaking during bag deployment the cover (1) splits into at least two flaps (13, 15).

3. An airbag cover (1) according to claim 1, wherein the break line (6) comprises a first linear portion (7) arranged horizontally in the center of the cover (1), going through the decorative element (3), and second portions (9, 9'; 11, 11') following the contour of the cover (1) from ends of said first linear portion(7) such that, when the cover (1) breaks in half, two flaps (13, 15) are formed in each one of two halves.

4. An airbag cover (1) according to claim 1, wherein a surface of the decorative element (3) is coated with a layer of a material providing it with a metallic appearance, applied by means of one of the following techniques: sputtering, high-vacuum evaporation, electrolytic deposit or lacquer coating.

5. An airbag cover (1) according to claim 1, wherein the decorative element has a polygonal shape selected from the group consisting of a triangle, a square and a trapezoid.

6. An airbag cover (1) according to claim 1, wherein the decorative element (3) and the break line (6) intersect in intersection areas and wherein the U-shaped grooves have bases (19,21) which are of reduced thickness such that the decorative element is weakened in the intersection areas.

7. An airbag cover (1) according to claim 6, wherein the break line (6) is configured so that when breaking during a deployment the cover (1) splits into at least two flaps (13, 15).

8. An airbag cover (1) according to claim 6, wherein the break line (6) comprises a first linear portion (7) arranged horizontally in the center of the cover (1), going through the decorative element (3), and second portions (9, 9'; 11, 11') following the contour of the cover (1) from ends of said first linear portion (7) such that when the cover (1) breaks in half, two flaps (13,15) are formed in each of two halves.

\* \* \* \* \*